US011801840B2

(12) United States Patent
Takahashi et al.

(10) Patent No.: US 11,801,840 B2
(45) Date of Patent: Oct. 31, 2023

(54) WORK VEHICLE, CONTROL METHOD, AND RECORDING MEDIUM

(71) Applicant: KUBOTA CORPORATION, Osaka (JP)

(72) Inventors: Keiji Takahashi, Sakai (JP); Tatsuya Sakai, Sakai (JP); Naoya Okamoto, Sakai (JP); Ryuji Kitagawa, Sakai (JP); Tsuyoshi Gono, Sakai (JP)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 17/543,779

(22) Filed: Dec. 7, 2021

(65) Prior Publication Data

US 2022/0185282 A1   Jun. 16, 2022

(30) Foreign Application Priority Data

Dec. 15, 2020  (JP) .................................. 2020-207671
Dec. 15, 2020  (JP) .................................. 2020-207672

(51) Int. Cl.
*B60W 30/188*  (2012.01)
*B60K 35/00*  (2006.01)
(Continued)

(52) U.S. Cl.
CPC .......... *B60W 30/188* (2013.01); *B60K 35/00* (2013.01); *B60Q 9/00* (2013.01); *B60W 10/06* (2013.01);
(Continued)

(58) Field of Classification Search
CPC .... B60W 10/06; B60W 10/10; B60W 30/188; B60W 2300/152; B60W 2540/00;
(Continued)

(56) References Cited

U.S. PATENT DOCUMENTS 7,472,684 B1 * 1/2009 McKee ................... F02D 29/02
                                                       123/352
8,131,434 B2   3/2012 Nishi et al.
(Continued)

FOREIGN PATENT DOCUMENTS

JP   2008-144628 A   6/2008
JP   2009-287469 A  12/2009
(Continued)

OTHER PUBLICATIONS

Official Communication issued in corresponding European Patent Application No. 21209200.1, dated Apr. 26, 2022.
(Continued)

*Primary Examiner* — Edwin A Young
(74) *Attorney, Agent, or Firm* — KEATING AND BENNETT, LLP (57) ABSTRACT

A work vehicle includes an engine, a transmission to change a received rotational force to a rotational force at a gear ratio that corresponds to a desired vehicle speed and output the changed rotational force, a first operating tool to change the rotation speed of the engine and a deceleration rate of the transmission, a rotation speed controller to control the rotation speed of the engine based on an input provided to the first operating tool, and a second operating tool to receive a holding instruction to hold the rotation speed of the engine constant. In response to the holding instruction being inputted to the second operating tool, the rotation speed controller is configured or programmed to disable control of the rotation speed of the engine which control is based on the input provided to the first operating tool, and hold the rotation speed of the engine constant in accordance with the holding instruction.

13 Claims, 8 Drawing Sheets

(51) Int. Cl.
*B60Q 9/00* (2006.01)
*B60W 10/06* (2006.01)
*B60W 10/10* (2012.01)
*B62D 49/06* (2006.01)

(52) U.S. Cl.
CPC ......... *B60W 10/10* (2013.01); *B62D 49/0692* (2013.01); *B60K 2370/167* (2019.05); *B60W 2300/152* (2013.01); *B60W 2540/00* (2013.01); *B60W 2710/0644* (2013.01); *B60W 2710/1044* (2013.01)

(58) Field of Classification Search
CPC .. B60W 2710/0644; B60W 2710/1044; B60K 35/00; B60K 2370/167; B60Q 9/00; B62D 49/0692
See application file for complete search history.

(56) References Cited

U.S. PATENT DOCUMENTS

| 2009/0056964 | A1* | 3/2009 | Kunizawa | E02F 3/7613 |
| | | | | 172/823 |
| 2011/0166755 | A1* | 7/2011 | Eguchi | B60W 30/188 |
| | | | | 701/54 |
| 2013/0030667 | A1 | 1/2013 | Fujimoto et al. | |
| 2014/0003900 | A1* | 1/2014 | Hyodo | E02F 3/431 |
| | | | | 414/685 |
| 2014/0129110 | A1 | 5/2014 | Fujimoto et al. | |
| 2016/0200322 | A1* | 7/2016 | Chin | B60W 30/182 |
| | | | | 701/36 |
| 2019/0112789 | A1* | 4/2019 | Fukuda | E02F 3/3414 |

FOREIGN PATENT DOCUMENTS

| JP | 2013-050205 A | 3/2013 |
| JP | 2014-028584 A | 2/2014 |

OTHER PUBLICATIONS

Official Communication issued in corresponding Japanese Patent Application No. 2020-207672, dated Aug. 29, 2023.

* cited by examiner

WORK VEHICLE, CONTROL METHOD, AND RECORDING MEDIUM

CROSS REFERENCE TO RELATED APPLICATIONS

This application is based on and claims priority under 35 U.S.C. Section 119 to Japanese Patent Application No. 2020-207671 and No. 2020-207672 filed on Dec. 15, 2020, the entire contents of each of which are incorporated herein by reference.

BACKGROUND OF THE INVENTION

1. Field of the Invention

This disclosure relates to technology pertaining to a work vehicle that includes an engine.

2. Description of the Related Art

Work vehicles that include an engine have conventionally been used. JP 2009-287469A, which is described below, describes an example of technology related to such a work vehicle that includes an engine.

JP 2009-287469A describes an accelerator control structure in a work vehicle. In the work vehicle described in JP 2009-287469A, a target rotation speed setting means selects an engine rotation speed that is set by an operation performed on an accelerator pedal (pedal-set rotation speed), an engine rotation speed set by an operation performed on an accelerator lever (lever-set rotation speed), and an upper limit rotation speed that indicates an upper limit set by an upper limit setting unit with respect to the engine rotation speed. The target rotation speed setting means compares the selected rotation speeds, and if both the pedal-set rotation speed and the lever-set rotation speed are lower than the upper limit rotation speed, the target rotation speed setting means sets the target rotation speed to whichever one of the pedal-set rotation speed and the lever-set rotation speed is higher, whereas if either the pedal-set rotation speed or the lever-set rotation speed is higher than the upper limit rotation speed, the target rotation speed setting means sets the upper limit rotation speed as the target rotation speed.

SUMMARY OF THE INVENTION

Some work vehicles include a work unit that is driven with the use of a rotational force from the engine. In the case where the technology described in JP 2009-287469A is applied to such a work vehicle, when the accelerator pedal is operated in order to increase the vehicle speed, the rotation speed of the rotational force input to the work unit increases along with the vehicle speed. Accordingly, variations sometimes occur in work operations depending on the type of work being performed (i.e., the work result is not uniform), and there is room for improvement in the technology described in JP 2009-287469A.

In view of this, there is a need for technology related to a work vehicle in which it is possible for only the vehicle speed to be increased when the rotation speed of the engine is increased.

In the work vehicle described in JP 2009-287469A, the accelerator pedal is provided in the right foot region of the riding driver portion, and the accelerator lever is provided on the right side of the driver seat. Also, the upper limit setting unit is constituted by a potentiometer or the like. When driving the work vehicle, the driver often looks at the region in front of the work vehicle while operating the accelerator pedal and accelerator lever, and it is preferable that the upper limit setting unit is provided at a position where it can be easily operated while looking forward. However, the technology described in JP 2009-287469A does not consider the location where the upper limit setting unit is provided, and thus there is room for improvement.

In view of this, there is a need for technology related to a work vehicle that allows the driver to easily set the engine rotation speed.

A work vehicle according to an aspect of a preferred embodiment of the present disclosure includes an engine, a transmission to change a received rotational force to a rotational force at a gear ratio that corresponds to a desired vehicle speed and output the changed rotational force, a first operating tool to change a rotation speed of the engine and a deceleration rate of the transmission, a rotation speed controller configured or programmed to control the rotation speed of the engine based on an input provided to the first operating tool, and a second operating tool to receive a holding instruction to hold the rotation speed of the engine constant, wherein in response to the holding instruction being inputted to the second operating tool, the rotation speed controller is configured or programmed to disable control of the rotation speed of the engine which control is based on the input provided to the first operating tool, and hold the rotation speed of the engine constant in accordance with the holding instruction.

In this case, the work machine is provided with the first operating tool that defines and functions as both an operating tool to change the rotation speed of the engine and an operating tool to change the deceleration rate of the transmission, and even if the first operating tool is operated, it is possible to travel with a constant engine rotation speed regardless of the vehicle speed. Accordingly, it is possible for only the vehicle speed to be increased when the rotation speed of the engine is increased. Also, the rotation speed of the device that utilizes the rotation of the engine (the rotation speed of a work unit or the like) can be made constant, thus making it possible to obtain a uniform work result. Moreover, the operator can focus on work without worrying about the rotation speed of the engine, thus making it possible to reduce the amount of labor required to set the rotation speed of the engine. Accordingly, it is possible to contribute to a reduction in the work load.

In a work vehicle according to a preferred embodiment of the present disclosure, a configuration is possible in which the work vehicle further includes a setter to set the second operating tool to either be able to or unable to accept the holding instruction, wherein in response to the setter performing the setting such that the second operating tool is to be unable to accept the holding instruction, the rotation speed controller is configured or programmed to control the rotation speed of the engine based on the input provided to the first operating tool.

In this case, in the state where the holding instruction is not accepted by the second operating tool, the rotation speed of the engine can be automatically controlled in accordance with input provided to the first operating tool without performing any other setting.

In a work vehicle according to a preferred embodiment of the present disclosure, a configuration is possible in which the work vehicle further includes a notifier to, in response to the holding instruction being inputted to the second operating tool, issue a notification that the input has been provided to the first operating tool.

In this case, it is possible to notify the operator that an input was provided to the first operating tool. Accordingly, if the first operating tool is operated by mistake, for example, such an erroneous operation can be clearly indicated.

In a work vehicle according to a preferred embodiment of the present disclosure, a configuration is possible in which the control of the rotation speed of the engine by the rotation speed controller is switchable between a first mode in which the rotation speed of the engine is controlled based on the holding instruction and a second mode in which the rotation speed of the engine is controlled to achieve a higher rotation speed out of (i) the rotation speed of the engine that corresponds to the input provided to the first operating tool, and (ii) the rotation speed of the engine that corresponds to the holding instruction.

In this case, the rotation speed of the engine can be set in various ways, thus making it possible to easily set the rotation speed of the engine according to the work situation. Accordingly, it is possible to control the optimum rotation speed of the engine according to an input provided to the first operating tool, without being affected by the mechanisms that transmit rotational forces of the engines to devices, for example.

In a work vehicle according to a preferred embodiment of the present disclosure, a configuration is possible in which, while the rotation speed controller is controlling the rotation speed of the engine in the first mode, switching from the first mode to the second mode is restricted.

In this case, it is possible to prevent a sudden change in the rotation speed of the engine while the rotation speed of the engine is being controlled in the first mode.

A control method for controlling an engine rotation speed of a work vehicle according to an aspect of a preferred embodiment of this disclosure includes changing a rotational force received by a transmission to a rotational force at a gear ratio that corresponds to a desired vehicle speed and outputting the changed rotational force, changing a rotation speed of the engine and a deceleration rate of the transmission based on an operation performed on a first operating tool, controlling the rotation speed of the engine based on an input provided to the first operating tool, and allowing a holding instruction to be received by a second operating tool, the holding instruction being an instruction to hold the rotation speed of the engine constant, wherein in the controlling, in response to the holding instruction being inputted to the second operating tool, control of the rotation speed of the engine which control is based on the input provided to the first operating tool is disabled, and the rotation speed of the engine is held constant in accordance with the holding instruction.

In this case as well, it is possible for only the vehicle speed to be increased when the rotation speed of the engine of the work vehicle is increased.

A non-transitory computer readable recording medium according to an aspect of a preferred embodiment of the present disclosure stores thereon a control program for execution by a computer to control an engine rotation speed of a work vehicle, the control program causing the computer to perform a transmission function of changing a rotational force received by a transmission to a rotational force at a gear ratio that corresponds to a desired vehicle speed and outputting the changed rotational force, a first operating function of changing a rotation speed of the engine and a deceleration rate of the transmission based on an operation performed on a first operating tool, a rotation speed controlling function of controlling the rotation speed of the engine based on an input provided to the first operating tool, and a second operating function of allowing a holding instruction to be received by a second operating tool, the holding instruction being an instruction to hold the rotation speed of the engine constant, wherein in response to the holding instruction being inputted to the second operating tool, the rotation speed controlling function disables control of the rotation speed of the engine which control is based on the input provided to the first operating tool, and holds the rotation speed of the engine constant in accordance with the holding instruction.

If such a control program is installed in a computer via such a recording medium and implemented by the computer, it is possible for only the vehicle speed to be increased when the rotation speed of the engine of the work vehicle is increased.

A work vehicle according to an aspect of a preferred embodiment of the present disclosure includes an engine, a driver seat, a front panel in front of the driver seat, a first operating tool to change a rotation speed of the engine, and a second operating tool to accept an instruction to set the rotation speed of the engine to a pre-stored rotation speed, and to set a maximum rotation speed to limit the rotation speed of the engine, wherein the second operating tool is provided in the front panel.

In this case, the second operating tool is provided on the front panel, and therefore the second operating tool can be easily operated even during driving. Accordingly, the driver can easily set the rotation speed of the engine.

In a work vehicle according to a preferred embodiment of the present disclosure, a configuration is possible in which the work vehicle further includes a steering wheel to steer a vehicle body, wherein the second operating tool overlaps with the steering wheel in a view from the driver seat toward the front panel.

In this case, the second operating tool can be operated simply by moving one hand holding the steering wheel toward the front panel side. Accordingly, the second operation tool can be easily operated even during driving.

In a work vehicle according to a preferred embodiment of the present disclosure, a configuration is possible which further includes a meter panel provided for the front panel to display information on the rotation speed of the engine, wherein the second operating tool is adjacent to the meter panel.

The meter panel is often disposed in the central portion of the front panel so as not to interfere with driving when the front panel is viewed during driving. Accordingly, in this case, by providing the setting switch adjacent to the meter panel, it is possible to prevent driving from being hindered even when the setting switch is operated.

In a work vehicle according to a preferred embodiment of the present disclosure, a configuration is possible in which the first operating tool is a lever that, in a view from the driver seat toward the front panel, extends from an inward region of the steering wheel toward a position which is in an outward region of the steering wheel and which is on a first side of a vehicle body in a width direction of the vehicle body, and in a view from the driver seat toward the front panel, the second operating tool is provided for a portion of the front panel which portion is on the first side of the vehicle body in the width direction of the vehicle body with respect to a central portion of the steering wheel.

In this case, the second operating tool can be operated with the same hand as the hand that operates the first operating tool. Accordingly, the opposite hand can hold the steering wheel, thus making it possible to prevent the operation of the first operating tool and the second operating tool from interfering with steering operations.

In a work vehicle according to a preferred embodiment of the present disclosure, a configuration is possible in which the second operating tool includes a single seesaw switch.

In this case, the second operating tool can be easily operated, thus making it possible to easily provide an instruction to set the rotation speed of the engine to the pre-stored engine rotation speed and to cancel the instruction.

In a work vehicle according to a preferred embodiment of the present disclosure, a configuration is possible in which operating the second operating tool allows (i) switching between a first mode to set the pre-stored rotation speed and a second mode to set the maximum rotation speed, and (ii) setting of the pre-stored rotation speed and the maximum rotation speed.

In this case, one device can be used to not only select the first mode and the second mode, but also set the rotation speed in each mode. Accordingly, setting can be performed easily, and an increase in device cost can be reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A work vehicle according to an aspect of this disclosure is configured such that it is possible for only the vehicle speed to be increased when the rotation speed of the engine is increased. A work vehicle according to the present preferred embodiment is described below. Note that in the following, a tractor 1 is described as an example of the work vehicle.

Figure 1:
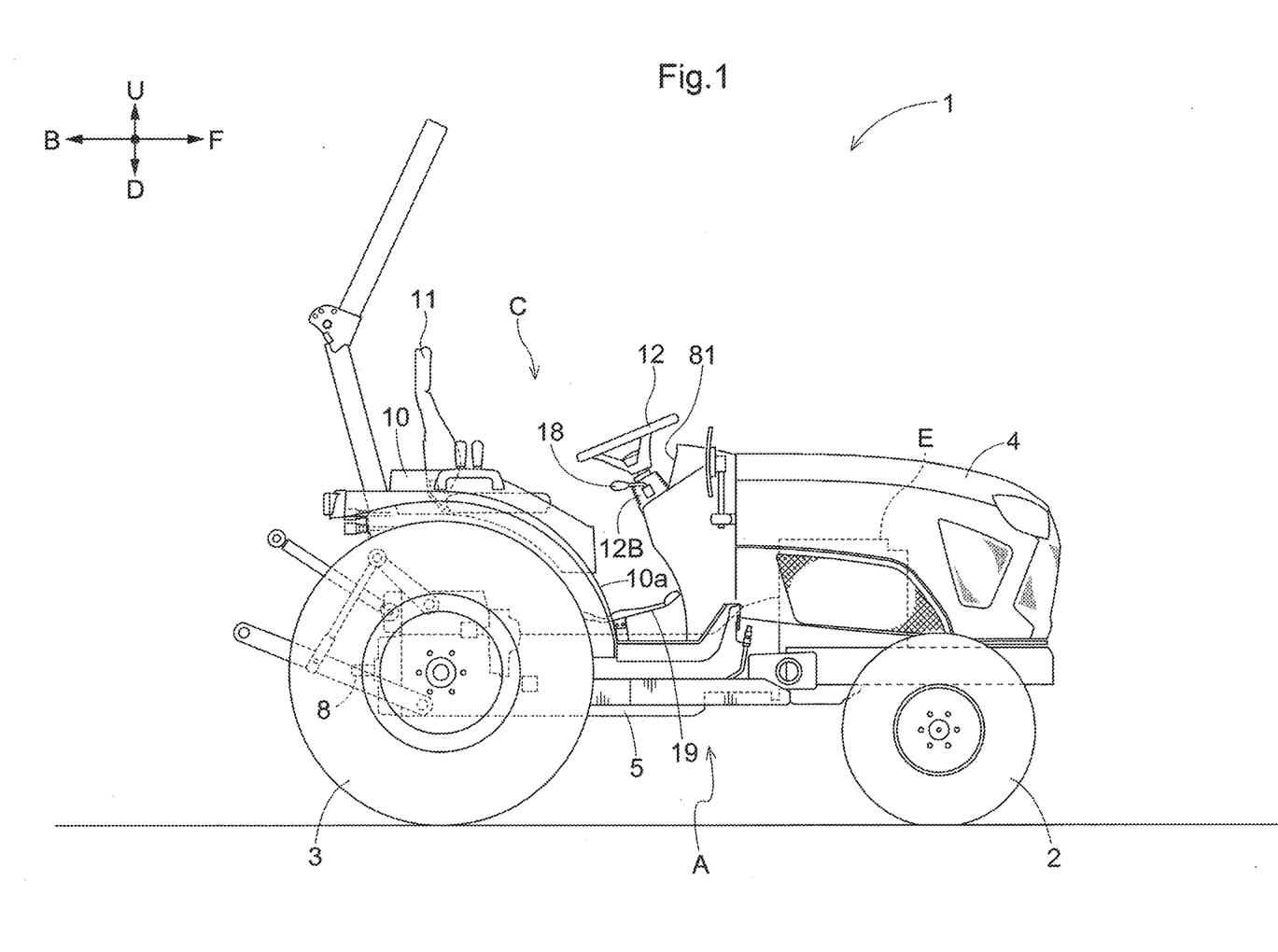
FIG. 1 is a side view of a work vehicle according to a first preferred embodiment of the present invention.
Figure 2:
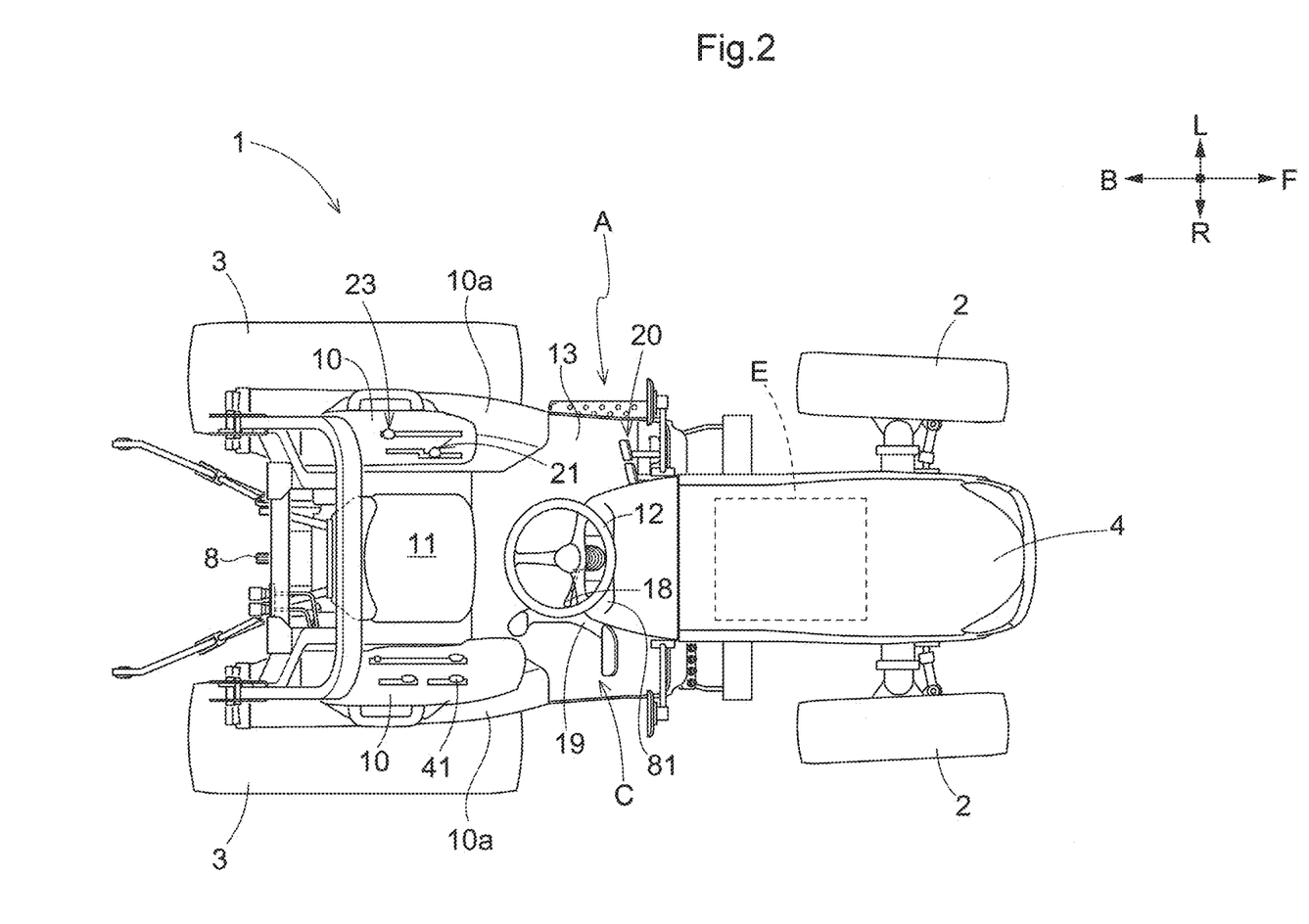
FIG. 2 is a plan view of the work vehicle according to the first preferred embodiment of the present invention.

FIG. 1 is a side view of the tractor 1, and FIG. 2 is a plan view of the tractor 1. Note that in the following description, regarding the tractor 1, the direction indicated by an arrow F shown in FIGS. 1 and 2 is the "forward direction", the direction indicated by an arrow B is the "backward (rearward) direction", the direction indicated by an arrow U is the "upward direction", the direction indicated by an arrow D is the "downward direction", the direction indicated by an arrow L is the "leftward direction", and the direction indicated by an arrow R is the "rightward direction".

In the tractor 1, a pair of left and right front wheels 2 and a pair of left and right rear wheels 3 are provided on a vehicle body A, an engine E is provided inside an engine bonnet 4 at the front portion of the vehicle body A, and a driving section C is provided at a rear position in the vehicle body A.

In the tractor 1, a transmission case 5 to control a driving force from the engine E is provided in a region that extends from the center of the vehicle body A to the rear end of the vehicle body A. Also, at the rear end of the transmission case 5, for example, an external power take-off shaft 8 (PTO shaft) to transmit a driving force to a rotary tiller (not shown) or the like is provided projecting rearward.

In the driving section C, a driver seat 11 that a worker (operator) sits in is provided at a middle position between left and right rear wheel fenders 10*a*, each of which includes a lever guide 10 on the upper surface, and a steering wheel 12 to steer the vehicle body A is provided in front of the driver seat 11. A floor 13 is provided under the driver seat 11, and a main shift pedal 19, which is mainly to change the rotation speed of the engine E when driving on a road, is provided on the floor 13. The main shift pedal 19 is configured to be capable of being pressed both forward and rearward. When this pedal is pressed forward, the rotation speed of the engine E increases, and the rotation speed output from a later-described main transmission 31 increases. When this pedal is pressed rearward, the rotation speed of the engine E is maintained at a predetermined rotation speed (idle rotation speed), and the vehicle body A moves rearward. When the operator's foot is lifted off the main shift pedal 19, the rotation speed of the engine E is set to the rotation speed set by a later-described accelerator lever 18. As shown in FIG. 2, a main shift lever 21 and an auxiliary shift lever 23 are arranged side by side and protrude upward from the lever guide 10 on the upper surface of the rear wheel fender 10*a* on the left side of the driver seat 11.

An accelerator lever 18 mainly used when changing the rotation speed of the engine E during field work is provided projecting outward to the right from the right side of a steering post 12B provided on the base end side of the steering wheel 12. The accelerator lever 18 is configured such that when it is pulled closer, the rotation speed of the engine E increases, and when it is pushed away, the rotation speed of the engine E decreases. When the accelerator lever 18 is released, the engine E rotation speed is set at that position. Note that although the rotation speed of the engine E can also be set by the main shift pedal 19 described above, the rotation speed of the engine E is set to the faster rotation speed out of the rotation speeds set by the accelerator lever 18 and the main shift pedal 19.

A PTO shift lever 41 capable of changing the rotation speed of the external power take-off shaft 8 is provided projecting upward from the lever guide 10 on the upper surface of the rear wheel fender 10a on the right side of the driver seat 11. The PTO shift lever 41 can be used to not only change the rotation speed of the external power take-off shaft 8, but also change the rotation direction. The PTO shift lever 41 may have a configuration other than a lever type (e.g., a switch or the like). Also, two brake pedals 20 capable of stopping the vehicle body A are arranged side by side (along the width direction of the vehicle body A) on the floor 13 in a forward view. The left and right brake pedals 20 are independent, the left brake pedal 20 can be depressed to apply braking force to the left driving wheel (rear wheel 3 in this preferred embodiment) of the tractor 1, and the right brake pedal 20 can be depressed to apply a braking force to the right driving wheel of the tractor 1. Also, if the two brake pedals 20 are connected by a coupling device (not shown) for example, a braking force is applied to the driving wheels on both the left and right sides at the same time. Of course, if the front wheels 2 are used as the driving wheels, the brake pedals 20 can be configured to apply a braking force to the front wheels 2.

Figure 3:
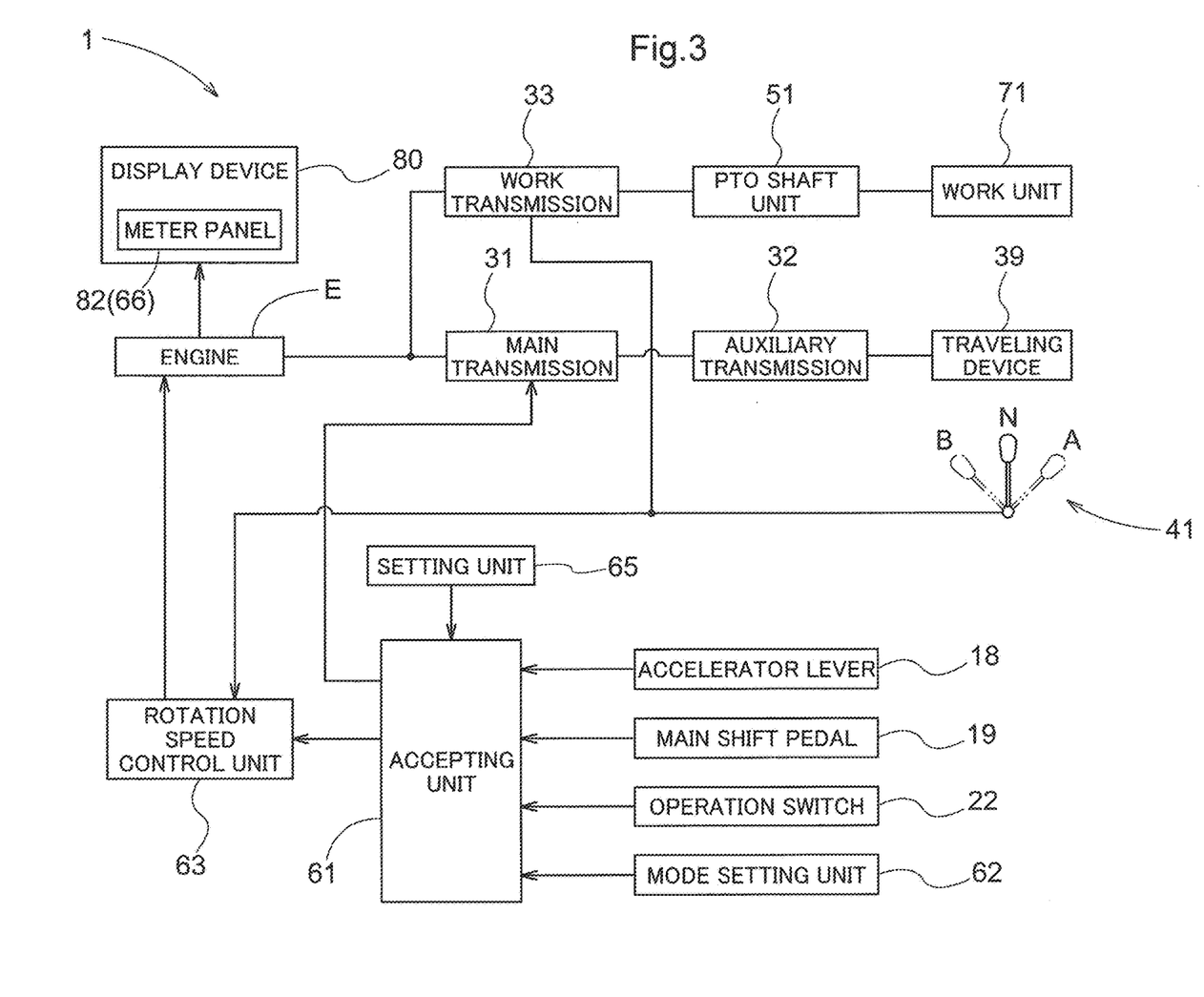
FIG. 3 is a block diagram showing functional units related to control of the rotation speed of the engine in the first preferred embodiment of the present invention.

The following describes control of the rotation speed of the engine E. FIG. 3 is a block diagram showing functional units pertaining to control of the rotation speed of the engine E. As shown in FIG. 3, the tractor 1 includes a main transmission 31 (an example of a "transmission"), an auxiliary transmission 32, and a work transmission 33.

The main transmission 31 changes an input rotational force to a rotational force at a gear ratio that corresponds to a desired vehicle speed, and outputs the resulting rotation force. In the present preferred embodiment, a rotational force is inputted from the engine E to the main transmission 31. The desired vehicle speed is a vehicle speed for driving the tractor 1, and is set by the operator, for example. Of course, the vehicle speed may be set automatically through automatic control or the like. The gear ratio is a ratio to change an input rotation speed to an output rotation speed. Accordingly, the main transmission 31 changes rotational force input from the engine E to a rotational force at a gear ratio that corresponds to a vehicle speed for driving the tractor 1, and outputs the resulting rotational force. As one example, a hydro-static continuously variable transmission (HST) can be used as the main transmission 31.

The auxiliary transmission 32 is provided upstream or downstream of the main transmission 31, changes an input rotational force to a rotational force at a gear ratio that corresponds to the work mode, and outputs the resulting rotation force. The upstream side of the main transmission 31 is the side where rotational force from the engine E is inputted to the main transmission 31, and the downstream side of the main transmission 31 is the side where the rotational force input from the engine E to the main transmission 31 is output. In the present preferred embodiment, as shown in FIG. 3, the auxiliary transmission 32 is provided on the downstream side of the main transmission 31, and a rotational force output from the main transmission 31 is inputted to the auxiliary transmission 32. The work mode is a mode that corresponds to the mode in which the tractor 1 is to travel, and examples include a mode suitable for traveling during field work, and a mode suitable for moving to a field. In other words, it is preferable that the mode is set according to the traveling speed of the tractor 1. Accordingly, the auxiliary transmission 32 is provided on the downstream side of the main transmission 31, and is configured to change a rotational force from the main transmission 31 to a rotational force at a gear ratio that corresponds to the mode in which the tractor 1 travels, and output the resulting rotational force.

The rotational force output from the auxiliary transmission 32 is transmitted to a traveling device 39 that controls a driving force applied to the driving wheels of the tractor 1. Of course, if the front wheels 2 are used as the driving wheels, the traveling device 39 can be configured to control driving force applied to the front wheels 2.

The gear ratio of the main transmission 31 is controlled in accordance with operations performed on the main shift lever 21 described above. The gear ratio of the auxiliary transmission 32 is controlled in accordance with operations performed on the auxiliary shift lever 23 described above.

Also, an output from the engine E is inputted to the work transmission 33. The work transmission 33 changes the rotational force from the engine E and transmits the resulting rotational force to a PTO shaft unit 51. Accordingly, an output from the engine E is inputted to the PTO shaft unit 51. The PTO shaft unit 51 includes the above-mentioned external power take-off shaft 8, and transmits rotational power for external output to a work unit 71 that is coupled to the external power take-off shaft 8.

An accepting unit 61 accepts change information to change the rotation speed of the engine E and the deceleration rate of the main transmission 31. The change information to change the rotation speed of the engine E and the deceleration rate of the main transmission 31 is information indicating a rotation speed required of the engine E and a deceleration rate required of the main transmission 31. The rotation speed required of the engine E and the deceleration rate required of the main transmission 31 can be set by operations performed on the accelerator lever 18 and operations performed on the main shift pedal 19 by the operator as described above. For this reason, the accelerator lever 18 and the main shift pedal 19 correspond to a first operating tool that changes the rotation speed of the engine E and the deceleration rate of the main transmission 31. The change information accepted by the accepting unit 61 is transmitted to a later-described rotation speed controller 63 and the main transmission 31. Note that the operation input provided by using the accelerator lever 18 and the main shift pedal 19 may be transmitted to the main transmission 31 by wires (so-called by-wire type).

The rotation speed controller 63 controls the rotation speed of the engine E based on an input provided to the accelerator lever 18 and the main shift pedal 19. Information corresponding to the input provided to the accelerator lever 18 and the main shift pedal 19 is transmitted to the rotation speed controller 63 via the accepting unit 61. Based on this information, the rotation speed controller 63 performs control to obtain a rotation speed of the engine E that corresponds to the gear ratio of the work transmission 33 that is based on the desired vehicle speed, and can set the rotation speed of the engine E to a rotation speed that corresponds to the rotation speed of the external output rotational power that is to be output from the PTO shaft unit 51.

In the present preferred embodiment, an operation switch (an example of a "second operating tool") is configured to receive a holding instruction to hold the rotation speed of the engine E constant. Holding the rotation speed of the engine E constant means holding the rotation speed of the engine E at a constant rotation speed, regardless of the rotation speed of the engine E pertaining to the input provided to the accelerator lever 18 and the main shift pedal 19 described above. Such a constant rotation speed may be stored in a storage unit (not shown) in advance. In the present preferred embodiment, such an instruction to hold the rotation speed of the engine E constant is treated as the holding instruction. Accordingly, the operation switch 22 is configured to be able to receive an instruction to hold a preset engine E rotation speed at a constant rotation speed.

In the case where a holding instruction is inputted to the operation switch 22, the rotation speed controller 63 disables control of the rotation speed of the engine E which control is based on the input provided to the accelerator lever 18 and the main shift pedal 19, and holds the rotation speed of the engine E constant in accordance with the holding instruction. The case where the holding instruction is inputted is a case where a holding instruction for holding the rotation speed of the engine E constant is inputted via the operation switch 22. The input provided to the accelerator lever 18 and the main shift pedal 19 is inputted to change the rotation speed of the engine E and the deceleration rate of the main transmission 31, which is provided via the accelerator lever 18 and the main shift pedal 19. Accordingly, if a holding instruction for holding the rotation speed of the engine E constant is inputted via the operation switch 22, the rotation speed controller 63 disables control of the rotation speed of the engine E which control is based on a corresponding input out of an input to change the rotation speed of the engine E and input to change the deceleration rate of the main transmission 31, which are provided via the accelerator lever 18 and the main shift pedal 19. Also, the rotation speed controller 63 performs control to hold the rotation speed of the engine E constant based on the holding instruction to hold the rotation speed of the engine E constant, which is provided via the operation switch 22.

Note that at this time, out of the input to change the rotation speed of the engine E and the input to change the deceleration rate of the main transmission 31, which are provided via the accelerator lever 18 and the main shift pedal 19, the input to change the deceleration rate of the main transmission 31 is enabled, and therefore the deceleration rate of the main transmission 31 can be changed according to such input.

Here, a configuration is also possible in which a setting unit 65 sets whether or not the holding instruction can be accepted by the operation switch 22. Here, "whether or not the holding instruction can be accepted by the operation switch 22" means whether or not the holding instruction input via the operation switch 22 is enabled, or whether or not the holding instruction can be input to the operation switch 22 itself. In other words, the setting unit 65 manually turns on and off the function of instructing the holding of the rotation speed of the engine E by the operation switch 22. A configuration is possible in which such setting by the setting unit 65 can be performed by an operation performed on a setting switch (not shown) by the operator, for example. In the case where the setting unit 65 is configured to set the second operating tool to either be able to or unable to accept the holding instruction, a configuration is possible in which the setting status set by the setting unit 65 is transmitted to the accepting unit 61 and then transmitted to the rotation speed controller 63 via the accepting unit 61. Alternatively, the setting may be transmitted directly from the setting unit 65 to the rotation speed controller 63. In the case where the setting unit 65 has performed setting such that the holding instruction cannot be accepted, the rotation speed controller 63 controls the rotation speed of the engine E based on an input provided to the accelerator lever 18 and the main shift pedal 19. This makes it possible to hold the rotation speed of the engine E at a desired rotation speed.

Also, if the setting unit 65 has performed setting such that the holding instruction can be accepted, it is preferable that a notification unit 66 notifies that input was performed on the accelerator lever 18 and the main shift pedal 19. Accordingly, when input is performed via the accelerator lever 18 or the main shift pedal 19, the operator can recognize that a change to the rotation speed of the engine E is not enabled, and only the deceleration rate of the main transmission 31 can be changed. The notification provided by the notification unit 66 may be achieved by displaying characters or images on a display device 80, or may be achieved by using the display of the meter panel 82.

Figure 4:
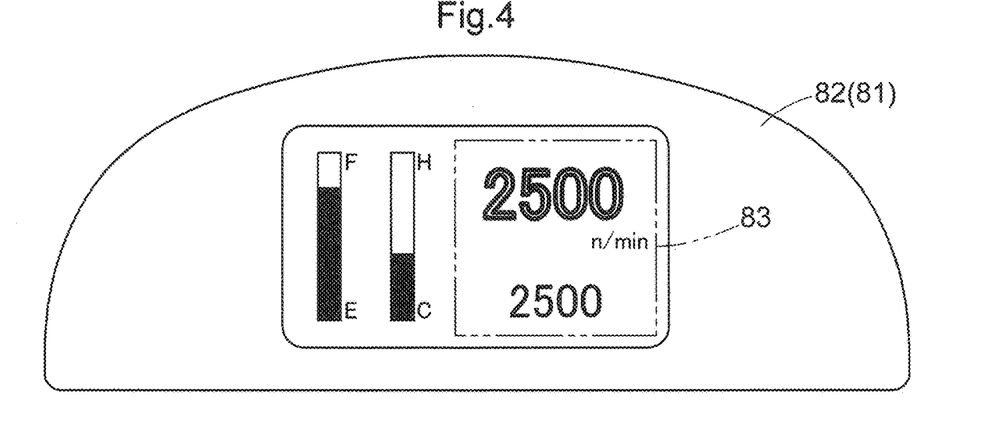
FIG. 4 is a diagram showing an example of a display shown by a meter panel in the first preferred embodiment of the present invention.

FIG. 4 shows an example of a display shown by the meter panel 82 (a portion of the display device 80) incorporated in the front panel 81 provided in front of the driver seat. The current rotation speed of the engine E is displayed in the upper portion of a rotation speed display area 83 on the meter panel 82, and a rotation speed (preset rotation speed) at which the rotation speed of the engine E is to be kept constant in response to the holding instruction provided by the operation switch 22 is displayed in the lower portion of the rotation speed display area 83. In the example in FIG. 4, it is shown that the rotation speed is being controlled by the operation switch 22, "2500" is displayed as the current rotation speed per minute of the engine E, and "2500" is displayed as the number of rotations per minute according to the operation switch 22. When the engine E is controlled according to the rotation speed input by the operation switch 22, the current rotation speed "2500" is displayed in an emphasized manner (e.g., is lit up, displayed brighter than other displays, or displayed in bold numbers). In the example shown in FIG. 4, an example is shown in which the rotation speed shown in the upper portion of the rotation speed display area 83 is lit up. Accordingly, the operator can recognize that the rotation speed of the engine E is being controlled according to the operation switch 22. By observing such a display, the operator can also recognize that the accelerator lever 18 and the main shift pedal 19 are not being operated.

Figure 5:
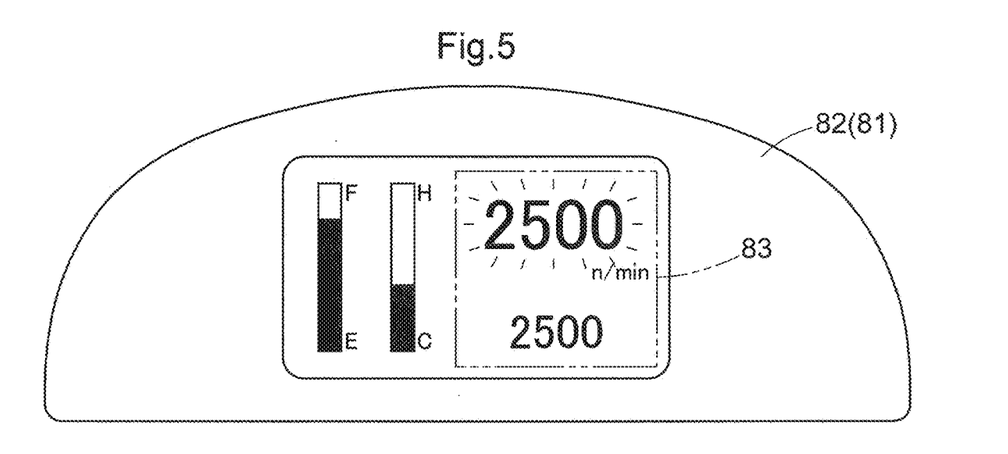
FIG. 5 is a diagram showing an example of a display shown by the meter panel in the first preferred embodiment of the present invention.

Also, if an input to change the rotation speed of the engine E is performed using the accelerator lever 18 or the main shift pedal 19 in the state shown in FIG. 4, and the rotation speed set by the operation switch 22 (constant rotation speed) is exceeded, then as shown in FIG. 5, it is preferable to flash the current rotation speed of the engine E displayed in the upper portion of the rotation speed display area 83. As a result, the operator can recognize that the rotation speed set by the operation switch 22 has been exceeded as a result of operating the accelerator lever 18 or the main shift pedal 19.

Figure 6:
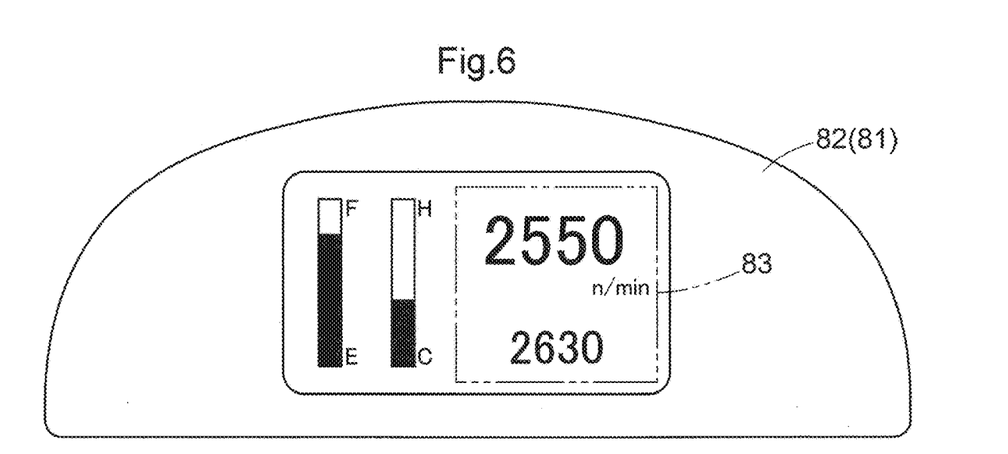
FIG. 6 is a diagram showing an example of a display shown by the meter panel in the first preferred embodiment of the present invention.

Also, if the operation switch 22 is pressed in the state of FIG. 5 in order to stop the control of the rotation speed according to the operation switch 22, then as shown in FIG. 6, the rotation speed of the engine E input via the accelerator lever 18 or the main shift pedal 19 is displayed in the lower portion of the rotation speed display area 83, and the current rotation speed of the engine E is displayed in the upper portion. In the example in FIG. 6, "2630" is displayed as the rotation speed of the engine E input via the accelerator lever 18 or the main shift pedal 19, and "2550" is displayed as the current rotation speed of the engine E. Note that the rotation speed of the engine E is controlled to follow input provided by the accelerator lever 18 and the main shift pedal 19, and if the rotation speed of the engine E reaches "2630", "2630" is displayed in the upper portion.

In the present preferred embodiment, the rotation speed controller 63 is configured or programmed to be able to control the rotation speed of the engine E by switching to either a first mode or a second mode. For example, a mode setting unit 62 may be provided as a functional unit that performs such switching. The mode setting unit 62 switches to either the first mode in which the rotation speed of the engine E is controlled based on the holding instruction, or the second mode in which control is performed to achieve the higher rotation speed out of the rotation speed of the engine E that corresponds to input provided to the accelerator lever 18 and the rotation speed of the engine E that corresponds to input provided to the main shift pedal 19.

The first mode is a control mode in which, in the case where the setting unit 65 is provided, control is executed if it is set that the holding instruction can be accepted, and furthermore the holding instruction has been input by the operation switch 22.

Also, the second mode is a control mode in which, in the case where the setting unit 65 is provided, if it is set that the holding instruction can be accepted, control is executed to achieve the higher rotation speed out of the rotation speed of the engine E that corresponds to the holding instruction input by the operation switch 22 and the rotation speed of the engine E that corresponds to input provided to the accelerator lever 18 or the main shift pedal 19.

Such switching between the first mode and the second mode can be set by the operator by operating the setting unit 65. Accordingly, it is preferable to provide a switch or the like as the setting unit 65.

As another example, a configuration is possible in which when the rotation speed controller 63 is controlling the rotation speed of the engine E in the first mode, switching from the first mode to the second mode is restricted. Accordingly, if the setting unit 65 is mistakenly operated while the rotation speed of the engine E is being kept constant, it is possible to prevent the rotation speed from being changed in accordance with a change instruction provided by the accelerator lever 18 or the main shift pedal 19.

In the above preferred embodiment, the accelerator lever 18 and the main shift pedal 19 have been described as non-limiting examples of the first operating tool, but the first operating tool may be either the accelerator lever 18 or the main shift pedal 19. Also, although the operation switch 22 has been described as an example of the second operating tool, the second operating tool may be configured by a device different from the operation switch (e.g., a lever or the like).

In the above preferred embodiment, it is described that the setting unit 65 is provided, but a configuration is possible in which the setting unit 65 is not provided. In such a case, for example, it is preferable that if an input is provided by the second operating tool, the input provided by the second operating tool is enabled when performing control. Also, in the case where the setting unit 65 is not provided, a configuration is possible in which, if the holding instruction to hold the rotation speed of the engine E constant is inputted via the operation switch 22, when the first operating tool is operated, the notification unit 66 provides a notification that an input was provided via the first operating tool.

In the above preferred embodiment, it is described that the notification unit 66 is provided, but a configuration is possible in which the notification unit 66 is not provided.

In the above preferred embodiment, control of the rotation speed of the engine E by the rotation speed controller 63 can be switched between the first mode in which the rotation speed of the engine E is controlled based on the holding instruction and the second mode in which control is performed to achieve the higher rotation speed out of the rotation speed of the engine E that corresponds to input provided to the accelerator lever 18 or the main shift pedal 19 and the rotation speed of the engine E that corresponds to the holding instruction, but a configuration is possible in which control of the rotation speed of the engine E by the rotation speed controller 63 cannot be switched between the first mode and the second mode, that is to say, control is only performed in the second mode.

In the above preferred embodiment, it is described that switching from the first mode to the second mode is restricted when the rotation speed controller 63 is controlling the rotation speed of the engine E in the first mode, but a configuration is possible in which a switch to the second mode can be performed even when the rotation speed controller 63 is controlling the rotation speed of the engine E in the first mode.

In the above preferred embodiment, the work transmission 33 is provided to receive an output from the engine E, change the speed of the output of the engine E, and transmit the resulting output to the PTO shaft unit 51, but a configuration is possible in which the work transmission 33 is not provided.

In the above preferred embodiment, the tractor 1 is described as an example of the work machine, but the work machine may be a work machine other than the tractor 1, such as a rice transplanter, a combine, a construction machine, a lawn mower, or a work machine that performs civil engineering work, forest work, snow removal work, or the like.

Also, a configuration is possible in which the processing performed by the functional units in the above preferred embodiment is realized as a control method for controlling the rotation speed of the engine of a work vehicle.

In this case, a control method for controlling a rotation speed of an engine of a work vehicle includes a transmission step of changing a rotational force input to a transmission to a rotational force at a gear ratio that corresponds to a desired vehicle speed, and outputting the changed rotational force, a first operating step of changing a rotation speed of the engine and a deceleration rate of the transmission based on an operation performed on a first operating tool, a rotation speed controlling step of controlling the rotation speed of the engine based on an input provided to the first operating tool, and a second operating step of allowing a holding instruction to be input a second operating tool, the holding instruction being an instruction to hold the rotation speed of the engine constant, wherein in the rotation speed controlling step, if the holding instruction is inputted to the second operating tool, control of the rotation speed of the engine which control is based on the input provided to the first operating tool is disabled, and the rotation speed of the engine is held constant in accordance with the holding instruction.

Also, a configuration is possible in which the functional units in the above preferred embodiment are realized as a non-transitory computer readable recording medium having recorded thereon a control program for execution by a computer to control the rotation speed of the engine of a work vehicle. In this case, an aspect of a non-transitory computer readable recording medium has recorded thereon a control program for execution by a computer to cause the computer to control the rotation speed of the engine of the work vehicle by performing a transmission function of changing a rotational force input to a transmission to a rotational force at a gear ratio that corresponds to a desired vehicle speed and outputting the changed rotational force, a first operating function of changing a rotation speed of the engine and a deceleration rate of the transmission based on an operation performed on a first operating tool, a rotation speed controlling function of controlling the rotation speed of the engine based on an input provided to the first operating tool, and a second operating function of allowing a holding instruction to be input a second operating tool, the holding instruction being an instruction to hold the rotation speed of the engine constant, wherein if the holding instruction is inputted to the second operating tool, the rotation speed controlling function disables control of the rotation speed of the engine which control is based on the input provided to the first operating tool, and holds the rotation speed of the engine constant in accordance with the holding instruction.

Second Preferred Embodiment

A work vehicle according to an aspect of a second preferred embodiment of the present disclosure is configured such that it is possible for only the vehicle speed to be increased when the rotation speed of the engine is increased. A work vehicle according to the present preferred embodiment is described below. Note that in the following, a tractor 100 is described as an example of the work vehicle.

Figure 7:
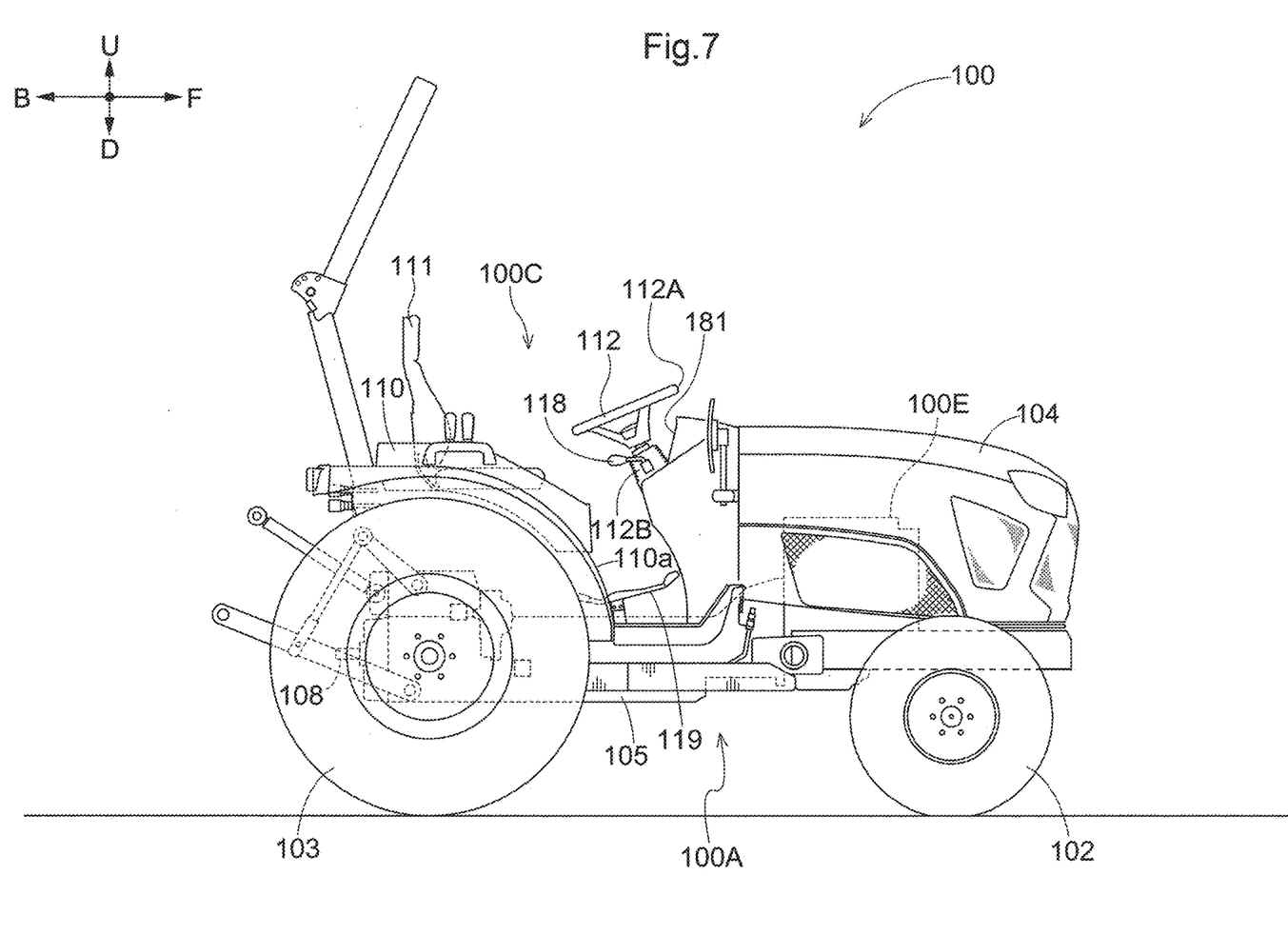
FIG. 7 is a side view of a work vehicle according to a second preferred embodiment of the present invention.
Figure 8:
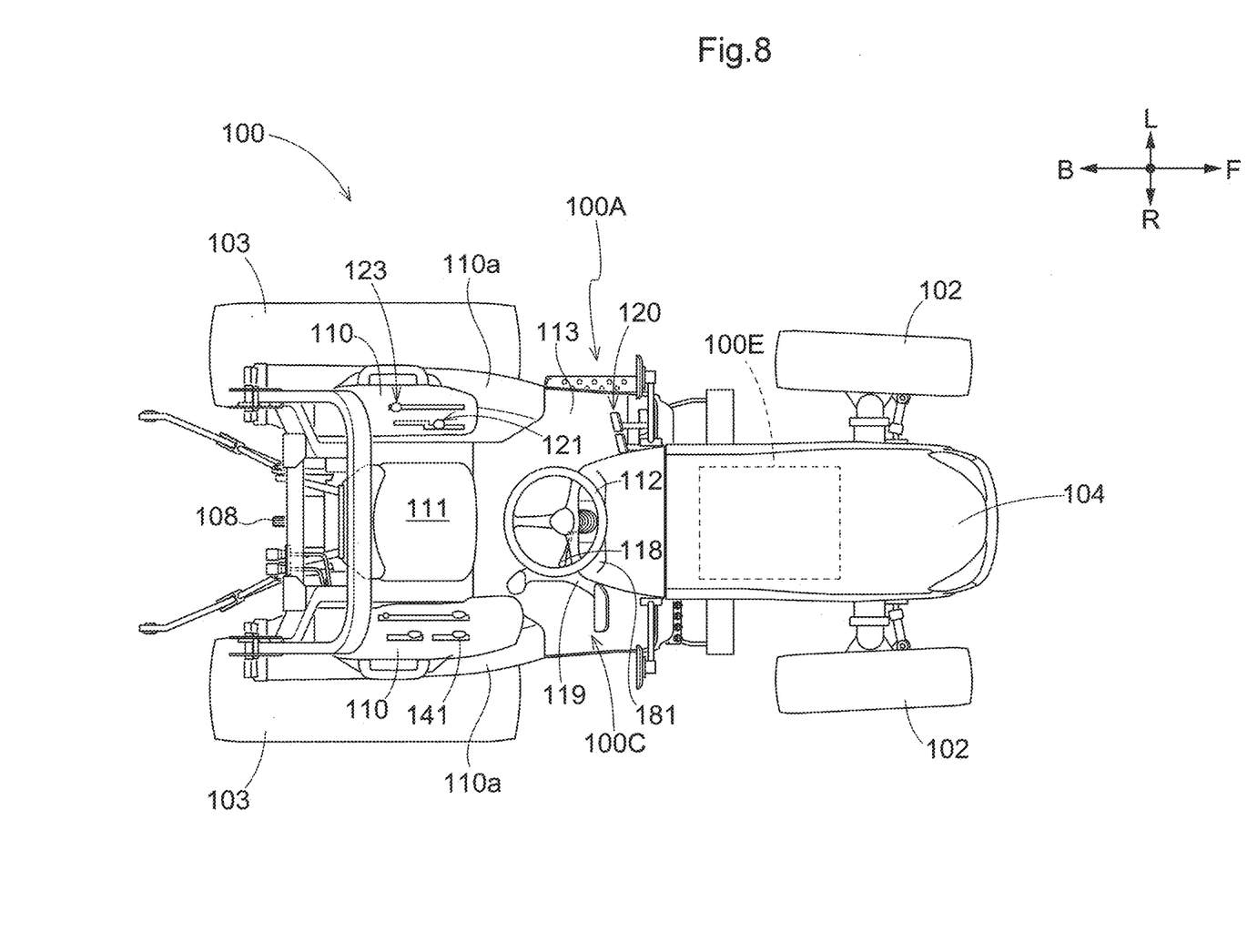
FIG. 8 is a plan view of the work vehicle according to the second preferred embodiment of the present invention.

FIG. 7 is a side view of the tractor 100, and FIG. 8 is a plan view of the tractor 100. Note that in the following description, regarding the tractor 100, the direction indicated by an arrow F shown in FIGS. 7 and 8 is the "forward direction", the direction indicated by an arrow B is the "rearward (rearward) direction", the direction indicated by an arrow U is the "upward direction", the direction indicated by an arrow D is the "downward direction", the direction indicated by an arrow L is the "leftward direction", and the direction indicated by an arrow R is the "rightward direction".

In the tractor 100, a pair of left and right front wheels 102 and a pair of left and right rear wheels 103 are provided on a vehicle body 100A, an engine 100E is provided inside an engine bonnet 104 at the front portion of the vehicle body 100A, and a driving section 100C is provided at a rear position in the vehicle body 100A.

In the tractor 100, a transmission case 105 to control a driving force from the engine 100E is provided in a region that extends from the center of the vehicle body 100A to the rear end of the vehicle body 100A. Also, at the rear end of the transmission case 105, for example, an external power take-off shaft 108 (PTO shaft) to transmit a driving force to a rotary tiller (not shown) or the like is provided projecting rearward.

In the driving section 100C, a driver seat 111 that a worker (operator) sits in is provided at a middle position between left and right rear wheel fenders 110a, each of which has a lever guide 110 on the upper surface, and a steering wheel 112 to steer the vehicle body 100A is provided in front of the driver seat 111. A floor 113 is provided under the driver seat 111, and a main shift pedal 119, which is mainly to change the rotation speed of the engine 100E when driving on a road, is provided on the floor 113. The main shift pedal 119 is configured to be capable of being pressed both forward and rearward. When this pedal is pressed forward, the rotation speed of the engine 100E increases, and the rotation speed output from a main transmission increases. When this pedal is pressed rearward, the rotation speed of the engine 100E is maintained at a predetermined rotation speed (idle rotation speed), and the vehicle body 100A moves rearward. When the operator's foot is lifted off the main shift pedal 119, the rotation speed of the engine 100E is set to the rotation speed set by a later-described accelerator lever 118. As shown in FIG. 8, a main shift lever 121 and an auxiliary shift lever 123 are arranged side by side and protrude upward from the lever guide 110 on the upper surface of the rear wheel fender 110a on the left side of the driver seat 111.

An accelerator lever 118 mainly used when changing the rotation speed of the engine 100E during field work is provided projecting outward to the right from the right side of a steering post 112B provided on the base end side of the steering wheel 112. The accelerator lever 118 is configured such that when it is pulled closer, the rotation speed of the engine 100E increases, and when it is pushed away, the rotation speed of the engine 100E decreases. When the accelerator lever 118 is released, the rotation speed of the engine 100E is set at that position. Note that although the rotation speed of the engine 100E can also be set by the main shift pedal 119 described above, the rotation speed of the engine 100E is set to the faster rotation speed out of the rotation speeds set by the accelerator lever 118 and the main shift pedal 119.

A PTO shift lever 141 capable of changing the rotation speed of the external power take-off shaft 108 is provided projecting upward from the lever guide 110 on the upper surface of the rear wheel fender 110a on the right side of the driver seat 111. The PTO shift lever 141 can be used to not only change the rotation speed of the external power take-off shaft 108, but also change the rotation direction. The PTO shift lever 141 may have a configuration other than a lever type (e.g., a switch or the like). Also, two brake pedals 120 capable of stopping the vehicle body 100A are arranged side by side (along the width direction of the vehicle body 100A) on the floor 113 in a forward view. The left and right brake pedals 120 are independent, the left brake pedal 120 can be depressed to apply braking force to the left driving wheel (rear wheel 103 in this preferred embodiment) of the tractor 100, and the right brake pedal 120 can be depressed to apply braking force to the right driving wheel of the tractor 100. Also, if the two brake pedals 120 are connected by a coupling device (not shown) for example, braking force is applied to the driving wheels on both the left and right sides at the same time. Of course, if the front wheels 102 are used as the driving wheels, the brake pedals 120 can be configured to apply braking force to the front wheels 102.

Figure 9:
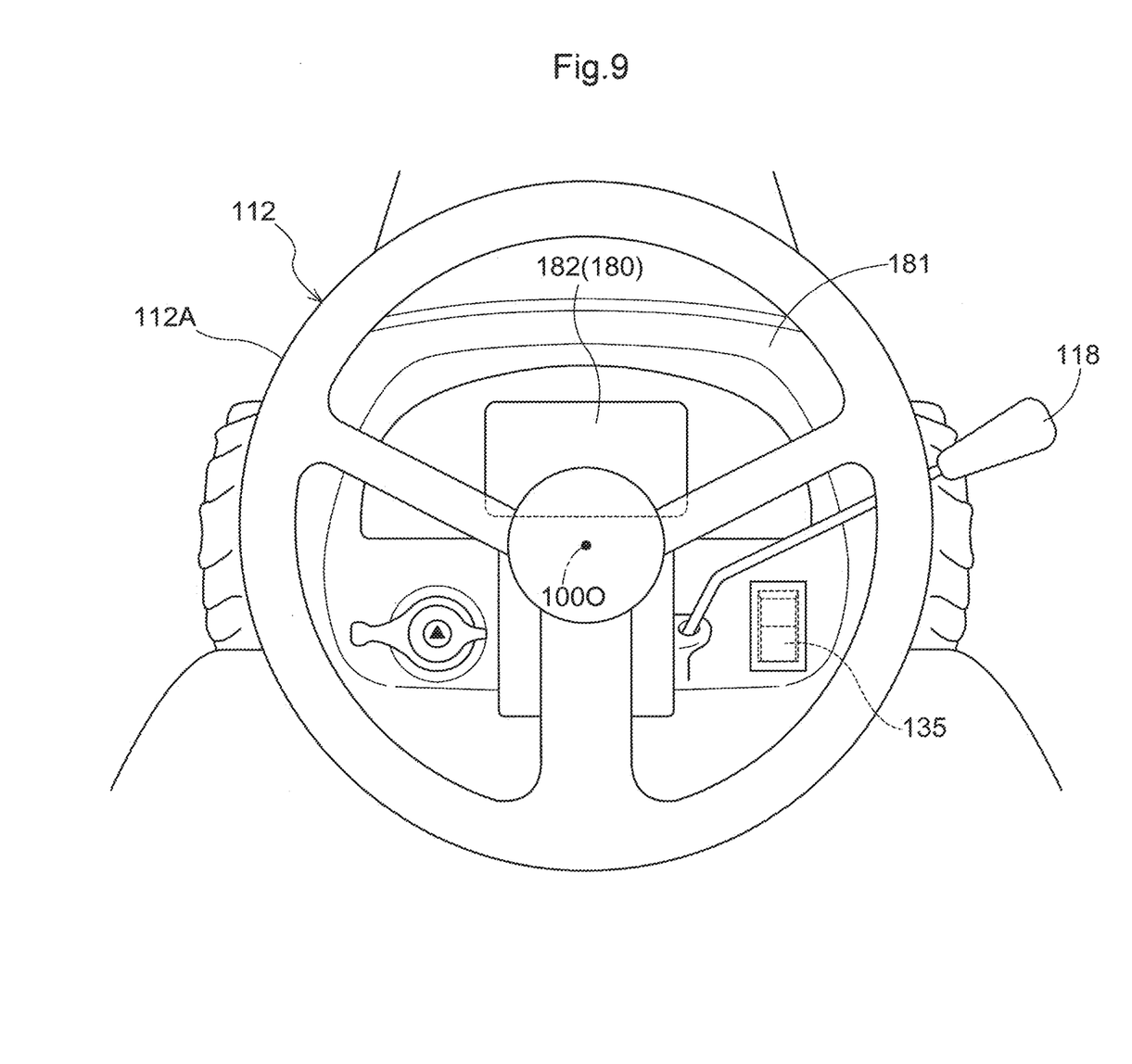
FIG. 9 is a view from a driver seat toward a front panel in the second preferred embodiment of the present invention.

FIG. 9 is a view from the driver seat 111 toward a front panel 181. As shown in FIG. 9, the front panel 181 is provided in front of the driver seat 111. The front panel 181 includes a meter panel 182 (portion of the display device 180) that displays the current rotation speed of the engine 100E.

Also, the front panel 181 includes a setting switch (an example of the "second operating tool") 135. The setting switch 135 can accept an instruction to set the rotation speed of the engine 100E to a rotation speed that has been stored in advance, and can set a maximum rotation speed to limit the rotation speed of the engine 100E. The instruction to change the rotation speed of the engine 100E to the pre-stored rotation speed is not an instruction to change the rotation speed of the engine 100E in accordance with an operation performed on the accelerator lever 118 or the main shift pedal 119, but rather is an instruction to set the rotation speed of the engine 100E to a rotation speed that is stored in advance in a storage unit (not shown). The maximum rotation speed to limit the rotation speed of the engine 100E is an upper limit value with respect to the rotation speed of the engine 100E, and is a rotation speed set by a limiter, for example. The setting switch 135 is configured to allow providing such an instruction and making such a setting.

As shown in FIG. 9, the setting switch 135 is provided at a position overlapped with the steering wheel 112 in a view from the driver seat 111 toward the front panel 181. "In a view from the driver seat 111 toward the front panel 181" means a state in which the operator looks forward while sitting in the driver seat 111 in order to drive the tractor 100. "Provided at a position overlapped with the steering wheel 112" means that the setting switch 135 is located behind (rearward of) the steering wheel 112, and closer to the front side of the vehicle body 100A than the steering wheel 112 is, in a view from the driver seat 111. Accordingly, the setting switch 135 is located behind (rearward of) the steering wheel 112 in the state where the operator is sitting in the driver seat 111 and looking forward in order to drive the tractor 100.

Also, the setting switch 135 is adjacent to the meter panel 182. The meter panel 182 is provided in the central portion of the front panel 181 so as not to interfere with driving when the front panel 181 is viewed during driving. Accordingly, by providing the setting switch 135 adjacent to the meter panel 182, it is possible to prevent operations from being hindered even when the operator operates the setting switch 135.

Figure 10:
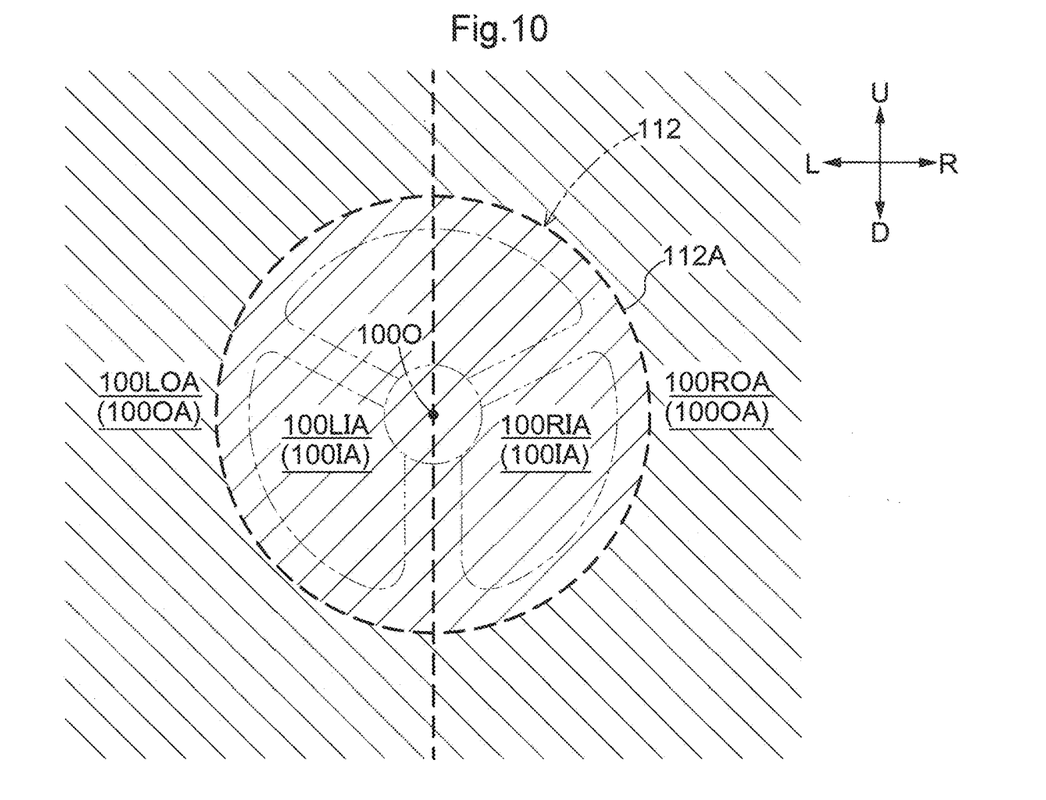
FIG. 10 is a diagram showing various regions in the second preferred embodiment of the present invention.

In the present preferred embodiment, in a view from the driver seat 111 toward the front panel 181, the accelerator lever 118 extends from the inward region of the steering wheel 112 toward a position on one side, with respect to the width direction of the vehicle body 100A, in the outward region of the steering wheel 112. "In a view from the driver seat 111 toward the front panel 181" means a state in which the operator looks forward while sitting in the driver seat 111 in order to drive the tractor 100 as described above. The "inward region of the steering wheel 112" refers to a region inward of (on an axis 1000 side of) an outer edge portion 112A when the steering wheel 112 is viewed from the outward side in the axial direction. FIG. 10 is a diagram for describing this outward region. The inward region of the steering wheel 112 corresponds to a region 100IA shown in FIG. 10. On the other hand, the "outward region of the steering wheel 112" refers to a region outward of the outer edge portion 112A (on the side opposite to the axis 1000) when the steering wheel 112 is viewed from the outward side in the axial direction. The outward region of the steering wheel 112 corresponds to a region 1000A shown in FIG. 8. In the present preferred embodiment, the one side in the width direction of the vehicle body 100A is the right side of the vehicle body 100A. In the outward region 100OA, the region toward the right side of the vehicle body 100A corresponds to a region 100ROA in FIG. 10. Accordingly, in the state where the operator is sitting in the driver seat 111 and looking forward in order to drive the tractor 100, when the steering wheel 112 is viewed from the outward side in the axial direction, the accelerator lever 118 extends from the region 100IA inward of the outer edge portion 112A toward the region 100ROA toward the right side of the vehicle body 100A in the region 100OA outward of the outer edge portion 112A. Note that in FIG. 10, the region toward the left side of the vehicle body 100A in the outward region 100OA is shown as a region 100LOA.

In a view from the driver seat 111 toward the front panel 181, the setting switch 135 is provided on one side, with respect to the width direction of the vehicle body 100A, of the central portion of the steering wheel 112 in the front panel 181. "In a view from the driver seat 111 toward the front panel 181" means a state in which the operator looks forward while sitting in the driver seat 111 in order to drive the tractor 100 as described above. The central portion of the steering wheel 112 is the axis 1000 of the steering wheel 112. The one side with respect to the with direction of the vehicle body 100A is the right side of the vehicle body 100A in the present preferred embodiment. Here, the setting switch 135 is provided at a position overlapped with the steering wheel 112 in a view from the driver seat 111 toward the front panel 181 as described above. Accordingly, the setting switch 135 is provided in a region 100RIA toward the right side of the vehicle body 100A in the inward region 100IA of the steering wheel 112 in the front panel 181 when the operator is sitting in the driver seat 111 and looking forward in order to drive the tractor 100. Note that in FIG. 10, the region toward the left side of the vehicle body 100A in the inner region 100IA of the steering wheel 112 is shown as a region 100LIA.

Figure 11:
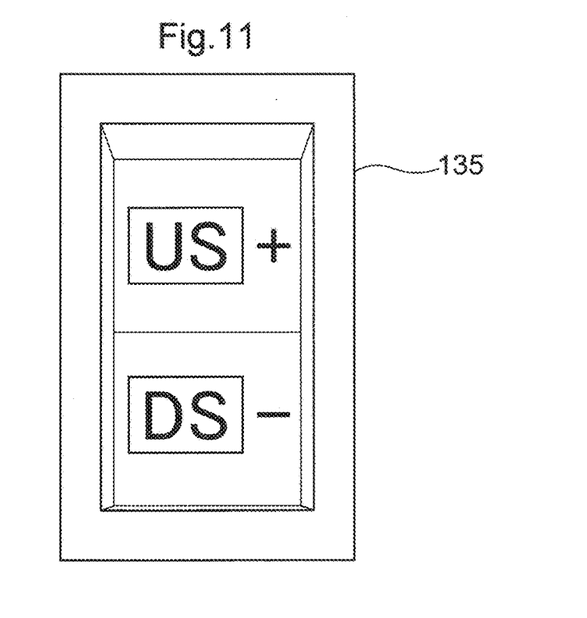
FIG. 11 is a diagram showing an example of a setting switch in the second preferred embodiment of the present invention.

In the present preferred embodiment, the setting switch 135 includes one seesaw switch, for example. A seesaw switch is a device that can switch the state of an electric circuit to either of two states at both ends (e.g., connection or disconnection) by either end of the switch being pressed, and is also called a rocker switch.

FIG. 11 shows the case where the setting switch 135 is configured using such a seesaw switch. In the example in FIG. 11, an up side US and a down side DS of the switch can be pressed, and the down side DS has been pressed. For example, it is also possible to provide a pilot lamp that lights at least portion of the up side US or the down side DS to clearly indicate the pressed side.

In the present preferred embodiment, the mode can be switched between a first mode and a second mode in accordance with an operation of the setting switch 135. The first mode is a mode to set a rotation speed to be stored in advance as a rotation speed to set the rotation speed of the engine 100E to the pre-stored rotation speed as described above. Specifically, when the rotation speed of the engine 100E is controlled according to the preset rotation speed, the rotation speed is controlled according to the rotation speed set in the first mode. The second mode is a mode to set the maximum rotation speed to limit the rotation speed of the engine 100E. In other words, the rotation speed of the engine 100E is limited so as not to exceed the rotation speed set in the second mode.

Also, the rotation speeds set in the first mode and the second mode can be increased or decreased by pressing the setting switch 135. The rotation speed set in the first mode is the rotation speed that is stored in advance as the rotation speed of the engine 100E, and the rotation speed set in the second mode is the maximum rotation speed of the engine 100E. As shown in FIG. 11, the rotation speed may be increased by pressing the up side US and decreased by pressing the down side DS, for example. In the example of FIG. 11, "+" is shown on the up side US and "−" is shown on the down side DS.

Specifically, the up side US is pressed and held for a predetermined time (e.g., 3 seconds). This makes it possible to enter the first mode. In this state, "+" or "−" is pressed to set the rotation speed of the engine 100E that is to be stored in advance. After the rotation speed of the engine 100E is set, the first mode is exited if no operations are performed for a predetermined time (e.g., 4 seconds). Also, the down side DS is pressed and held for a predetermined time (e.g., 3 seconds). This makes it possible to enter the second mode. In this state, "+" or "−" is pressed to set the maximum rotation speed of the engine 100E. After the maximum rotation speed of the engine 100E is set, the second mode is exited if no operations are performed for a predetermined time (e.g., 4 seconds). According to the above configuration, it is possible to perform setting in a plurality of modes with one seesaw switch.

It is also possible to provide the setting switch 135 with a reset function. In the case where the reset function is set using the down side DS, the set rotation speed (stored rotation speed) is canceled if the down side DS is pressed for a predetermined time (e.g., 3 seconds), and then the reset function (reset mode) can be exited after such cancelation if no operations are performed for a predetermined time (e.g., 4 seconds). The setting switch 135 can also be configured in this way.

In the above preferred embodiment, it is described that the setting switch 135 is provided at a position overlapped with the steering wheel 112 in a view from the driver seat 111 toward the front panel 181, but the setting switch 135 is not required to be provided at a position overlapped with the steering wheel 112 in a view from the driver seat 111 toward the front panel 181.

In the above preferred embodiment, it is described that the setting switch 135 is adjacent to the meter panel 182, but the setting switch 135 may be provided at a predetermined distance from the meter panel 182 instead of being adjacent thereto. Even in such a case, it is sufficient that the setting switch 135 can be reached by the operator when in the driving posture in the driver seat 111.

In the above preferred embodiment, it is described that the accelerator lever 118 is a lever that, in a view from the driver seat 111 toward the front panel 181, extends from the inward region 100IA of the steering wheel 112 toward a position on the right side of the vehicle body 100A in the outward region 100OA of the steering wheel 112. The accelerator lever 118 can, in a view from the driver seat 111 toward the front panel 181, extend from the inward region 100IA of the steering wheel 112 toward a position on the left side of the vehicle body 100A in the outward region 100OA of the steering wheel 112. Also, the accelerator lever 118 can, in a view from the driver seat 111 toward the front panel 181, extend toward one side, with respect to the width direction of the vehicle body 100A, in the outward region 100OA of the steering wheel 112.

In the above preferred embodiment, it is described that the setting switch 135 is provided on the side on which the accelerator lever 118 extends in the vehicle body 100A relative to the central portion of the steering wheel 112 in the front panel 181 in a view from the driver seat 111 toward the front panel 181, but the setting switch 135 may be provided on the side opposite to the side on which the accelerator lever 118 extends in the vehicle body 100A relative to the central portion of the steering wheel 112 in the front panel 181 in a view from the driver seat 111 toward the front panel 181.

In the above preferred embodiment, it is described that the setting switch 135 includes one seesaw switch, but the setting switch 135 may include a plurality of seesaw switches, or may include a switch other than a seesaw switch, such as a rotary switch or a toggle switch. Display as an icon on the display device 180 is also possible.

In the above preferred embodiment, it is described that operations of the setting switch 135 can be used to switch between the first mode to set the rotation speed that is stored in advance and the second mode to set the maximum rotation speed, and to set both the pre-stored rotation speed and the maximum rotation speed, but the setting switch 135 may have a configuration in which the function to switch between the first mode to set the rotation speed that is stored in advance and the second mode to set the maximum rotation speed is separate from the function to set the pre-stored rotation speed and the maximum rotation speed, that is to say, the setting switch 135 may be configured to have at least either one of such functions.

In the above preferred embodiment, the tractor 100 is described as an example of the work machine, but the work machine may be a work machine other than the tractor 100, such as a rice transplanter, a combine, a construction machine, a lawn mower, or a work machine that performs civil engineering work, forest work, snow removal work, or the like.

This disclosure is applicable to a work machine that includes an engine.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
an engine;
a transmission to change a received rotational force to a rotational force at a gear ratio that corresponds to a desired vehicle speed and output the changed rotational force;
a first operating tool to change a rotation speed of the engine and a deceleration rate of the transmission;
a rotation speed controller configured or programmed to control the rotation speed of the engine based on an input provided to the first operating tool; and
a second operating tool to receive a holding instruction to hold the rotation speed of the engine constant; wherein
in response to the holding instruction being inputted to the second operating tool, the rotation speed controller is configured or programmed to disable control of the rotation speed of the engine which control is based on the input provided to the first operating tool, and hold the rotation speed of the engine constant in accordance with the holding instruction.

2. The work vehicle according to claim 1, further comprising:
a setter to set the second operating tool to either be able to or unable to accept the holding instruction; wherein
in response to the setter performing a setting such that the second operating tool is to be unable to accept the holding instruction, the rotation speed controller is configured or programmed to control the rotation speed of the engine based on the input provided to the first operating tool.

3. The work vehicle according to claim 1, further comprising a notifier to, in response to the holding instruction being inputted to the second operating tool, provide a notification that the input has been provided to the first operating tool.

4. The work vehicle according to claim 1, wherein the control of the rotation speed of the engine by the rotation speed controller is switchable between a first mode in which the rotation speed of the engine is controlled based on the holding instruction and a second mode in which the rotation speed of the engine is controlled to achieve a higher rotation speed out of the rotation speed of the engine that corresponds to the input provided to the first operating tool and the rotation speed of the engine that corresponds to the holding instruction.

5. The work vehicle according to claim 4, wherein while the rotation speed controller is controlling the rotation speed of the engine in the first mode, switching from the first mode to the second mode is restricted.

6. A control method for controlling a rotation speed of an engine of a work vehicle, the control method comprising:
   changing a rotational force received by a transmission to a rotational force at a gear ratio that corresponds to a desired vehicle speed and outputting the changed rotational force;
   changing a rotation speed of the engine and a deceleration rate of the transmission based on an operation performed on a first operating tool;
   controlling the rotation speed of the engine based on an input provided to the first operating tool; and
   allowing a holding instruction to be received by a second operating tool, the holding instruction being an instruction to hold the rotation speed of the engine constant; wherein
   in the controlling, in response to the holding instruction being inputted to the second operating tool, control of the rotation speed of the engine which control is based on the input provided to the first operating tool is disabled, and the rotation speed of the engine is held constant in accordance with the holding instruction.

7. A non-transitory computer readable recording medium storing thereon a control program for execution by a computer to control a rotation speed of an engine of a work vehicle, the control program causing the computer to perform:
   a transmission function of changing a rotational force received by a transmission to a rotational force at a gear ratio that corresponds to a desired vehicle speed, and outputting the changed rotational force;
   a first operating function of changing a rotation speed of the engine and a deceleration rate of the transmission based on an operation performed on a first operating tool;
   a rotation speed controlling function of controlling the rotation speed of the engine based on an input provided to the first operating tool; and
   a second operating function of allowing a holding instruction to be received by a second operating tool, the holding instruction being an instruction to hold the rotation speed of the engine constant; wherein
   in response to the holding instruction being inputted to the second operating tool, the rotation speed controlling function disables control of the rotation speed of the engine which control is based on the input provided to the first operating tool, and holds the rotation speed of the engine constant in accordance with the holding instruction.

8. A work vehicle comprising:
   an engine;
   a driver seat;
   a front panel in front of the driver seat;
   a first operating tool to change a rotation speed of the engine; and
   a second operating tool to accept an instruction to set the rotation speed of the engine to a pre-stored rotation speed and to set a maximum rotation speed to limit the rotation speed of the engine; wherein
   the second operating tool is provided in the front panel.

9. The work vehicle according to claim 8, further comprising:
   a steering wheel to steer a vehicle body; wherein
   the second operating tool overlaps with the steering wheel in a view from the driver seat toward the front panel.

10. The work vehicle according to claim 8, further comprising:
    a meter panel provided for the front panel to display the rotation speed of the engine; wherein
    the second operating tool is adjacent to the meter panel.

11. The work vehicle according to claim 8, wherein
    the first operating tool is a lever that, in a view from the driver seat toward the front panel, extends from an inward region of the steering wheel toward a position which is in an outward region of the steering wheel and which is on a first side of a vehicle body in a width direction of the vehicle body; and
    in a view from the driver seat toward the front panel, the second operating tool is provided for a portion of the front panel which portion is on the first side of the vehicle body in the width direction of the vehicle body with respect to a central portion of the steering wheel.

12. The work vehicle according to claim 8, wherein the second operating tool includes a single seesaw switch.

13. The work vehicle according to claim 8, wherein operating the second operating tool allows switching between a first mode to set the pre-stored rotation speed and a second mode to set the maximum rotation speed, and allows setting of the pre-stored rotation speed and the maximum rotation speed.

* * * * *